(12) United States Patent
Ito et al.

(10) Patent No.: US 7,551,642 B2
(45) Date of Patent: Jun. 23, 2009

(54) DIGITAL MODULATING AND DEMODULATING DEVICE WHICH IS COMPATIBLE WITH BOTH PDH AND SDH SIGNALS BY DIVIDING INPUT SIGNAL IN MULTIPLE DIRECTIONS AND COMBINING INPUT SIGNALS FROM MULTIPLE DIRECTIONS WITH MATRIX SWITCHING UNIT

(75) Inventors: Yoshio Ito, Tokyo (JP); Seiji Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 508 days.

(21) Appl. No.: 11/207,268

(22) Filed: Aug. 17, 2005

(65) Prior Publication Data

US 2006/0039414 A1     Feb. 23, 2006

(30) Foreign Application Priority Data

Aug. 19, 2004   (JP) ............................... 2004-239432

(51) Int. Cl.
*H04J 3/16* (2006.01)
(52) U.S. Cl. ...................................... 370/466; 370/535
(58) Field of Classification Search ................. 370/535, 370/395, 466, 907
See application file for complete search history.

(56) References Cited

U.S. PATENT DOCUMENTS

| 5,416,768 | A | * | 5/1995 | Jahromi | ..................... | 370/360 |
| 2001/0036187 | A1 | * | 11/2001 | Lometti et al. | ............. | 370/395 |
| 2002/0075854 | A1 | * | 6/2002 | Kumar et al. | ............. | 370/352 |

FOREIGN PATENT DOCUMENTS

| EP | 1 653 644 | 5/2006 |
| JP | 11-215013 | 8/1999 |
| JP | 2000-224211 | 8/2000 |
| JP | 2002-009838 | 1/2002 |
| WO | WO 02/51069 | 6/2002 |

OTHER PUBLICATIONS

Barth, H et al., "TMN Aspects Regarding Radio Relay Systems For SDH And PDH Signals" European Conference on Radio Relay Systems, Conference Publication No. 386, Oct. 11-14, 1993.
European Search Report, European Patent Application No. 05017980, mailed May 15, 2006.
Schneider, W et al., "A N+2 Protection Switching System For Synchronous STM-1 Signals And Plesiochronous 140 MBIT/S Signals By Using Two Carrier Technique" European Conference on Radio Relay Systems, Conference Publication No. 386, Oct. 11-14, 1993.

* cited by examiner

*Primary Examiner*—Kwang B Yao
*Assistant Examiner*—Andrew Lai
(74) *Attorney, Agent, or Firm*—Michael Best & Friedrich LLP

(57) ABSTRACT

A digital modulating and demodulating device is compatible with both PDH and SDH signals by dividing and combining input signals in many directions with a matrix switching unit. The digital modulating and demodulating device is provided as a combination of two conventional PDH device with an SDH mapping circuit, an SDH demapping circuit, and an SDH interface for allowing SDH signals to be input to and output from the digital modulating and demodulating device. Since the matrix switching unit is capable of dividing and combining input signals in many directions, the digital modulating and demodulating device simultaneously provides interfaces for inputting and outputting a PDH baseband signal and an SDH signal, and makes it possible to combine conventional separate device for PDH and SDH signals with each other.

3 Claims, 9 Drawing Sheets $N \geq (a+b+c+ \cdots )$

DIGITAL MODULATING AND DEMODULATING DEVICE WHICH IS COMPATIBLE WITH BOTH PDH AND SDH SIGNALS BY DIVIDING INPUT SIGNAL IN MULTIPLE DIRECTIONS AND COMBINING INPUT SIGNALS FROM MULTIPLE DIRECTIONS WITH MATRIX SWITCHING UNIT

This application claims the priority of Japan Patent Application No. 2004-239432.filed Aug. 19, 2004.

BACKGROUND OF THE INVENTION

1. Field of the Invention

The present invention relates to a digital modulating and demodulating device for use in fixed microwave communication systems.

2. Description of the Related Art

In recent years, SDH (Synchronous Digital Hierarchy) standardized by ITU-T (International Telecommunication Union—Telecommunication standardization sector) and ITU-R (ITU—Radio communication sector) have been used as standards for communication networks for use in microwave communication systems. SDH was preceded by transmitter standards called PDH (Plesiochronous Digital Hierarchy).

Circuit arrangements of conventional digital modulating and demodulating device used in PDH and SDH systems will be described below with reference to FIGS. 1 and 2 in the accompanying drawings.

FIG. 1 shows a conventional PDH device. As shown in FIG. 1, the conventional PDH device comprises PDH line interface unit (LIU) 5, 6, signal multiplexer (MUX) 10, signal demultiplexer (DeMUX) 11, transmitter digital processing unit (TDPU) 14, receiver digital processing unit (RDPU) 15, modulator (MOD) 18, and demodulator (DEM) 19.

In FIG. 1, a number of PDH baseband signals such as E1/T1 signals applied to PDH baseband signal input terminal 1 are transmitted through PDH line interface unit 5. Then it is processed by signal multiplexer 10, transmitter digital processing unit 14, and converted into a module signal in the modulator 18. The modulated output signal is derived in the terminal 22. On the receiver side, a modulated signal applied to modulated signal input terminal 23 is processed by demodulator 19. This is then sent to the receiver digital processing unit 15, and signal demultiplexer 11 divides it into a number of baseband digital signals. The signals are then transmitted through PDH line interface unit 6 and outputted from PDH baseband signal output terminal 2.

The E1 signal represents a transmitter unit according to the European hierarchy standards and has a transmitter rate of 2.048 Mbps. The T1 signal represents a transmitter unit according to the US and Japanese hierarchy standards and has a transmitter rate of 1.544 Mbps.

FIG. 2 shows a conventional SDH device. As shown in FIG. 2, the conventional SDH device comprises SDH physical interfaces (SPI) 30, 31, SDH demapping circuit 34, SDH mapping circuit 35, signal multiplexer (MUX) 10, signal demultiplexer (DeMUX) 11, transmitter digital processing unit (TDPU) 14, receiver digital processing unit (RDPU) 15, modulator (MOD) 18, and demodulator (DEM) 19.

In FIG. 2, an SDH signal such as an STM (Synchronous Transport Module)-1 signal applied to SDH signal input terminal 26 is transmitted through SDH physical interface 30 and processed by SDH demapping circuit 34. Then it is fed to the signal multiplexer 10, transmitter digital processing unit 14 and finally into a modulated signal in the modulator 18. The output from modulated signal is derived in the output terminal 22. A modulated signal applied to modulated signal input terminal 23 is processed by demodulator 19, receiver digital processing unit 15, signal demultiplexer 11, and SDH mapping circuit 35 into an SDH signal, which is transmitted through SDH physical interface 35 and output from SDH signal output terminal 27.

STM-1 represents one of the transmitter units prescribed according to SDH, and is a signal having a transmitter rate of 155.52 Mbps.

At present, standards used in optical communication networks are shifting from PDH to SDH. However, since both PDH and SDH are currently present as standards in optical communication networks, PDH device or SDH device need to be selectively installed depending on the standards of signals to be transmitted and received. A PDH signal used in PDH device is a signal having a number of parallel channels as with E1/T1 signals, whereas an SDH signal used in SDH device is a two-wire signal having multiplexed channels such as an STM-1 signal. Therefore, PDH device and SDH device are structurally different from each other, and need to have other structural details for different transmitting directions.

As disclosed in Japanese laid-open patent publication No. 2000-224211, systems which handle both PDH and SDH signals are required to perform conversion processes such as multiplexing and demultiplexing and also to have complex connections, and need to have various system arrangements depending on the usage of signals to be handled.

FIG. 3 of the accompanying drawings shows a system arrangement of an intermediate repeater station employing the conventional PDH device shown in FIG. 1. As shown in FIG. 3, the intermediate repeater station comprises transmitter/receivers (TR) 95, 96, antennas 97, 98, and digital modulating and demodulating device 90, 91 each having the construction shown in FIG. 1.

A PDH signal such as an E1/T1 signal that is input to and output from digital modulating and demodulating device 90, 91 comprises a number of parallel channels. Therefore, two digital modulating and demodulating device 90, 91 need to be interconnected by a number of baseband signal cables. Because two digital modulating and demodulating device 90, 91 need to be interconnected by a number of baseband signal cables, the system shown in FIG. 3 suffers various difficulties such as interconnection errors, tedious and time-consuming installation processes, etc.

FIG. 4 of the accompanying drawings shows a system arrangement of an intermediate repeater station employing the conventional SDH device shown in FIG. 2. As shown in FIG. 4, the intermediate repeater station comprises transmitter/receivers (TR) 95, 96, antennas 97, 98, and digital modulating and demodulating device 92, 93 each having the construction shown in FIG. 2.

An SDH signal such as an STM-1 signal that is input to and output from digital modulating and demodulating device 92, 93 comprises a signal of multiplexed channels. Therefore, two digital modulating and demodulating device 92, 93 may be interconnected by only two coaxial cables, one for inputting a signal and one for outputting signal. However, because the plural channels are multiplexed into one signal, if a new channel is to be added to the signal between two digital modulating and demodulating device 92, 93, the system requires an ADM (Add Drop Module) device 94 as shown in FIG. 5 of the accompanying drawings.

As described above, the conventional digital modulating and demodulating device are available as structurally different PDH and SDH device, which need to have other structural details for different transmitting directions. PDH device have to be interconnected by as many cables as the number of PDH baseband signals such as E1/T1 signals, and SDH device have to have a separate device for dropping, inserting, and dividing an SDH baseband signal.

SUMMARY OF THE INVENTION

It is an object of the present invention to provide a digital modulating and demodulating device which is compatible with both PDH and SDH signals, needs a reduced number of cables for interconnecting two device, and does not require a separate device such as an ADM in a transmitter path for dropping, inserting, and dividing an SDH baseband signal.

According to the present invention, there is provided a digital modulating and demodulating device comprising:

an SDH signal input terminal for inputting an SDH signal;

an SDH signal output terminal for outputting an SDH signal;

a PDH baseband signal input terminal for inputting a PDH baseband signal;

a PDH baseband signal output terminal for outputting a PDH baseband signal;

first and second modulated signal input terminals for inputting modulated signals;

first and second modulated signal output terminals for outputting modulated signals;

a first SDH interface for extracting a clock signal from an SDH signal input from the SDH signal input terminal, converting a code format of the SDH signal, and outputting a converted data signal together with the extracted clock signal;

an SDH demapping circuit for being supplied with the data signal and the clock signal output from the first SDH interface, and demultiplexing the data signal into a number of channel signals;

an SDH mapping circuit for being supplied with the channel signals and a clock signal, mapping the supplied channel signal into a data signal according to a predetermined mapping process, and outputting the data signal together with the clock signal;

a second SDH interface for converting the data signal and the clock signal output from the SDH mapping circuit into an SDH signal having a predetermined interface format, and outputting the SDH signal from the SDH signal output terminal;

a first PDH interface for extracting a clock signal from a PDH baseband signal input from the PDH baseband signal input terminal, converting the PDH baseband signal into a digital signal having a predetermined format, and outputting the digital signal together with the extracted clock signal;

a second PDH interface for converting a supplied digital signal into a signal having a predetermined code format and outputting the converted signal from the PDH baseband signal output terminal;

a first signal multiplexer for multiplexing a number of supplied channel data signals;

a first transmitter digital processing unit for digitally processing a multiplexed digital signal output from the first signal multiplexer according to a process compatible with a modulating process for modulating the digital signal;

a first modulator for modulating a digital signal input from the first transmitter digital processing unit and outputting the modulated digital signal from the first modulated signal output terminal;

a first demodulator for demodulating a modulated signal input from the first modulated signal input terminal into a digital signal;

a first receiver digital processing unit for digitally processing a demodulated digital signal input from the first demodulator according to a process compatible with the process performed by the first transmitter digital processing unit;

a first signal demultiplexer for demultiplexing a data signal output from the first receiver digital processing unit into a number of digital channel signals;

a second signal multiplexer for multiplexing a number of channel data signals input thereto and outputting a multiplexed digital signal;

a second transmitter digital processing unit for digitally processing a multiplexed digital signal output from the second signal multiplexer according to a process compatible with a modulating process for modulating the digital signal;

a second modulator for modulating a digital signal input from the second transmitter digital processing unit and outputting a modulated signal from the second modulated signal output terminal;

a second demodulator for demodulating a modulated signal input from the second modulated signal input terminal into a digital signal;

a second receiver digital processing unit for digitally processing a demodulated digital signal input from the second demodulator according to a process compatible with the process performed by the second transmitter digital processing unit;

a second signal demultiplexer for demultiplexing a data signal output from the second receiver digital processing unit into a number of digital channel signals; and a matrix switching unit for outputting digital channel signals from the SDH demapping circuit, a digital signal from the first PDH interface, and digital signals from the first and second signal demultiplexers selectively to the SDH mapping circuit, the PDH interface, and the first and second signal multiplexers per channel based on preselected switching settings.

The digital modulating and demodulating device according to the present invention has the SDH interfaces, the PDH interfaces, and the SDH mapping and demapping circuits, and also has the matrix switching unit for dividing and combining input signals in many directions. Therefore, the digital modulating and demodulating device simultaneously provides interfaces for inputting and outputting a PDH baseband signal and an SDH signal. The digital modulating and demodulating device makes it possible to combine conventional separate device for PDH and SDH signals.

The digital modulating and demodulating device has two sets of signal multiplexers, transmitter digital processing units, modulators, signal demultiplexers, receiver digital processing units, and demodulators. The digital modulating and demodulating device can transmit signals selectively in two directions or can be constructed as an intermediate repeater station.

Since the digital modulating and demodulating device has the matrix switching unit and the SDH mapping and demapping circuits, a number of devices can be interconnected using SDH interfaces, and a minimum number of cables are required to interconnect the device.

Furthermore, even if the digital modulating and demodulating device is used as an SDH device, since it has a PDH interface, a separate device such as an ADM or the like is not required for dropping, adding, and dividing baseband signals in a transmitter path.

According to the present invention, the digital modulating and demodulating device may comprise two sets of the first and second SDH interfaces, the SDH mapping circuit, and the SDH demapping circuit.

If the first and second SDH interfaces, the SDH mapping circuit, and the SDH demapping circuit for inputting and outputting SDH and PDH signals are provided in two sets, then the digital modulating and demodulating device allows various system arrangements to be constructed for greater system flexibility.

The matrix switching unit may have sets of data input terminals arranged in respective four directions, and may comprise a matrix of switches each capable of outputting data input from one direction to a selected one of three directions.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 6:
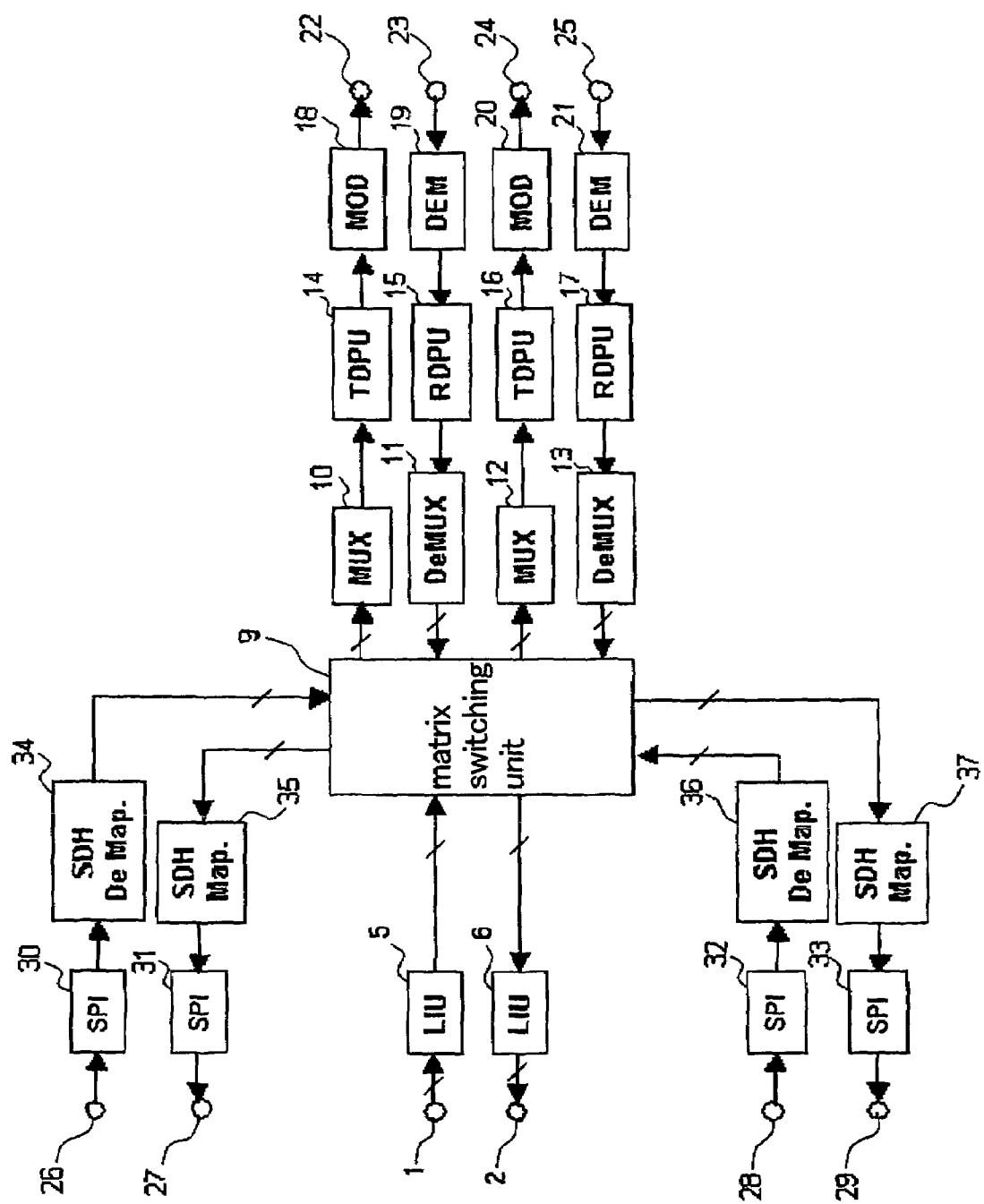
FIG. 6 is a block diagram of a digital modulating and demodulating device according to an embodiment of the present invention.

FIG. 6 shows in block form a digital modulating and demodulating device according to an embodiment of the present invention. Those parts of the digital modulating and demodulating device shown in FIG. 6 which are identical to those shown in FIGS. 1 and 2 are denoted by identical reference characters, and will not be described in detail below.

As shown in FIG. 6, the digital modulating and demodulating device according to the embodiment of the present invention comprises SDH signal input terminals 26, 28 for inputting SDH signals, SDH signal output terminals 27, 29 for outputting SDH signals, PDH baseband signal input terminal 1 for inputting PDH baseband signals, PDH baseband signal output terminal 2 for outputting PDH baseband signals, two modulated signal input terminals 23, 25 for inputting modulated signals, and two modulated signal output terminals 22, 24 for outputting modulated signals.

The digital modulating and demodulating device also comprises PDH line interface unit (LIU) 5, 6, matrix switching unit 9, signal multiplexers (MUX) 10, 12, signal demultiplexers (DeMUX) 11, 13, transmitter digital processing units (TDPU) 14, 16, receiver digital processing units (RDPU) 15, 17, modulators (MOD) 18, 20, demodulators (DEM) 19, 21, SDH physical interfaces (SPI) 30 through 33, SDH demapping circuits (SDH DeMap.) 34, 36, and SDH mapping circuits (SDH Map.) 35, 37.

Figure 1:
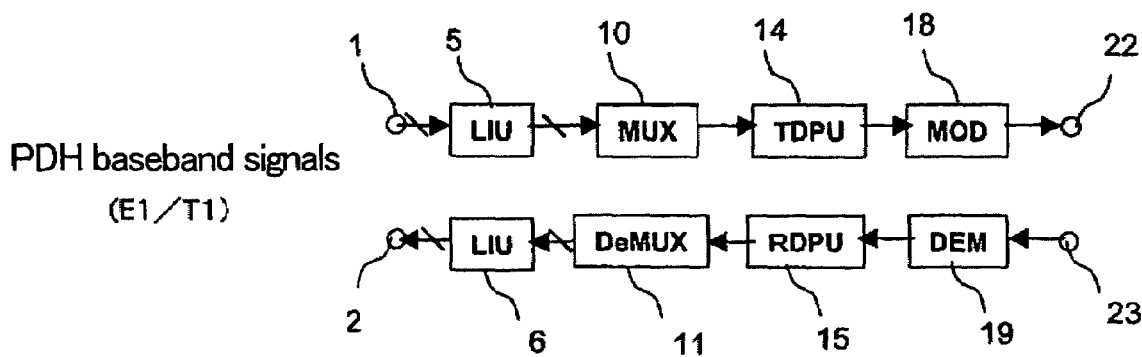
FIG. 1 is a block diagram of a conventional PDH device.
Figure 2:
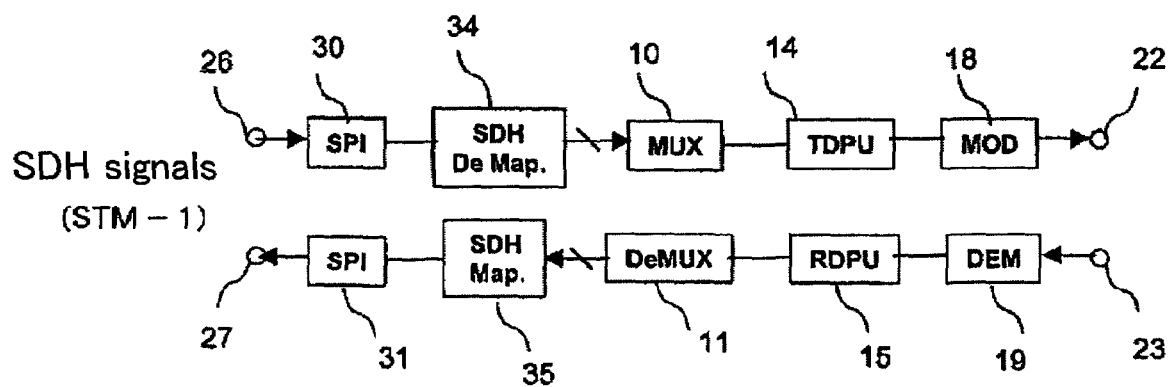
FIG. 2 is a block diagram of a conventional SDH device.
Figure 3:
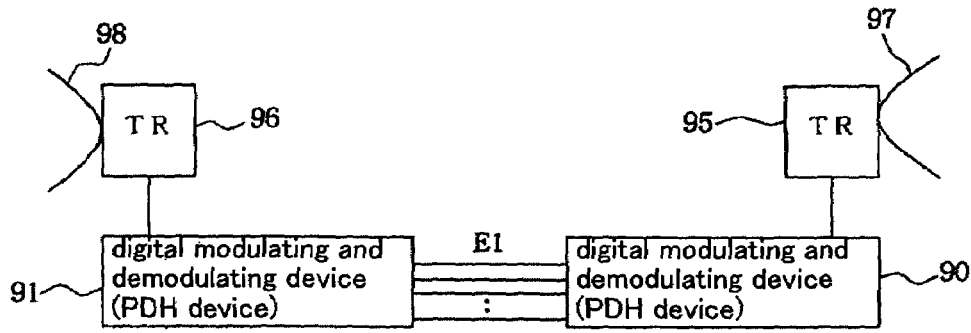
FIG. 3 is a block diagram of an intermediate repeater station incorporating the conventional PDH device shown in FIG. 1.
Figure 4:
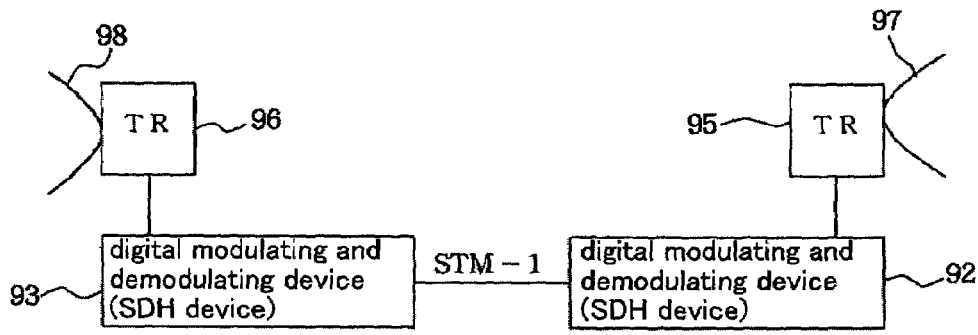
FIG. 4 is a block diagram of an intermediate repeater station incorporating the conventional SDH device shown in FIG. 2.
Figure 5:
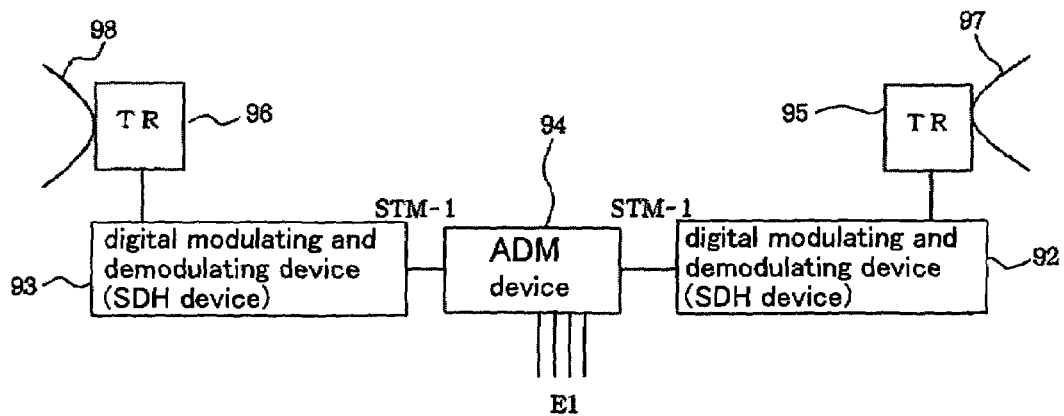
FIG. 5 is a block diagram of the intermediate repeater station shown in FIG. 4, with an ADM added thereto.

The digital modulating and demodulating device according to the embodiment of the present invention is a combination of two PDH device as shown in FIG. 1, SDH mapping circuits 35, 37, SDH demapping circuits 34, 36, and SDH physical interfaces 30 through 33, which allow SDH signals to be input and output. Matrix switching unit 9 allows input and output signals to be transmitted through freely established paths.

The digital modulating and demodulating device according to the embodiment of the present invention simultaneously provides interfaces for baseband signals such as E1/T1 signals for PDH device and SDH signals for SDH device. Matrix switching unit 9 can be software-configured to determine transmitting directions for all signals including PDH baseband signals to be dropped and added, per predetermined minimum unit such as E1/T1 signal. The digital modulating and demodulating device allows different device to be interconnected through a minimum number of cables using the SDH interfaces.

Operation of the components of the digital modulating and demodulating device according to the embodiment of the present invention will be described below.

SDH physical interface 30 is supplied with SDH signal such as STM-1 signals from SDH signal input terminal 26, extracts a clock signal from the supplied SDH signal which is of the CMI (Code Mark Inversion) format, converts the SDH signal into NRZ (Non Return-to-Zero) data, and outputs the NRZ data together with the extracted clock signal to SDH demapping circuit 34.

Signals input from SDH signal input terminal 26 include electric signals and optical signals. Both the electric signals and the optical signals are prescribed according to the ITU-T standards. Specifically, the electric signals are prescribed according to the ITU-T G.703, and the optical signals are prescribed according to the ITU-T G.957.

If an optical signal is input from SDH signal input terminal 26, then SDH physical interface 30 converts the optical signal into an electric signal, rather than converting a CMI format signal, and outputs the resultant data and clock signals to SDH demapping circuit 34.

SDH demapping circuit 34 is supplied with the data and clock signals from SDH physical interface 30, demultiplexes a number of multiplexed channel signals in the data signal, and outputs the demultiplexed channel signals to matrix switching unit 9. For example, SDH demapping circuit 34 demultiplexes a signal from SDH physical interface 30 into 63 channel signals having a transmitter rate of 2 Mbps, and outputs the demultiplexed 63 channel signals to matrix switching unit 9.

SDH mapping circuit 35 is supplied with a number of digital channel signals and a clock signal from matrix switching unit 9, maps the digital channel signals based on the mapping process prescribed according to ITU-T G.707, and outputs the mapped signal and the clock signal to SDH physical interface 31.

SDH physical interface 31 converts the data and clock signals from SDH mapping circuit 35 into a signal having the interface format (CMI format) prescribed according to ITU-T G.703, and outputs the converted signal to SDH signal output terminal 27. If an optical signal is supplied from SDH mapping circuit 35 to SDH physical interface 31, SDH physical interface 31 converts the optical signal into an optical signal having the interface type prescribed according to ITU-T G.957, and outputs the converted signal to SDH signal output terminal 27.

SDH physical interfaces 32, 33, SDH mapping circuit 36, and SDH demapping circuit 37 operate in the same manner as with SDH physical interfaces 30, 31, SDH mapping circuit 34, and SDH demapping circuit 35, respectively, and hence their operation will not be described in detail below.

If SDH signal input terminals 26, 28 and SDH signal output terminals 27, 29 are used to interconnect device only, then interface standards of their own may be employed.

PDH line interface unit 5 is supplied with PDH baseband signals from PDH baseband signal input terminal 1, and converts the supplied PDH baseband signals into signals having a format that can be processed by matrix switching unit 9. Specifically, since the PDH baseband signals from PDH baseband signal input terminal 1 are of a bipolar code format, PDH line interface unit 5 extracts a clock signal from the supplied PDH baseband signals, converts the bipolar signals into unipolar signals, and output the unipolar signals together with the clock signal to matrix switching unit 9.

PDH line interface unit 6 is supplied with unipolar signals and a clock signal from matrix switching unit 9, converts the unipolar signals into bipolar signals, and outputs the bipolar signals from PDH baseband signal output terminal 2.

Signal multiplexer 10 performs a N-to-M conversion process to multiplex N (=63) data signals each having a transmitter rate of 2 Mbps, output from matrix switching unit 9, into M digital signals. The value of M is appropriately set by the hardware arrangement of signal multiplexer 10. In the present embodiment, it is assumed that M=8.

Transmitter digital processing unit 14 is supplied with the M multiplexed digital signals, performs a rate conversion process to add a redundancy bit, e.g., an error-correcting bit, peculiar to a wireless transmitter zone, and also performs a string conversion process compatible with the modulating process of modulator 18. For example, if modulator 18 operates according to a QAM (Quadrature Amplitude Modulation) process, then transmitter digital processing unit 14 converts the signals from signal multiplexer 10 into seven data signals and a clock signal, and outputs the data signals and the clock signal to modulator 18.

Modulator 18 modulates the digital signals input from transmitter digital processing unit 14, and outputs the modulated signals from modulated signal output terminal 22.

Signal multiplexer 12, transmitter digital processing unit 16, and modulator 20 operate in the same manner as signal multiplexer 10, transmitter digital processing unit 14, and modulator 18, respectively, and their operation will not be described in detail below.

Demodulator 19 demodulates a modulated signal input from modulated signal input terminal 23 into a digital signal, and outputs the digital signal to receiver digital processing unit 15.

Receiver digital processing unit 15 is supplied with the digital signal from demodulator 19, and digitally processes the supplied digital signal according to a process compatible with the digital signal processing performed by transmitter digital processing unit 14 of an device connected through a wireless transmitter path. Specifically, receiver digital processing unit 15 performs forward error correction (FEC) on the supplied digital signal using the error-correcting bit added by transmitter digital processing unit 14, then deletes the error-correcting redundancy bit, and outputs M data signals to signal demultiplexer 11.

Signal demultiplexer 11 demultiplexes the M data signals input from receiver digital processing unit 15 into N digital signals, and outputs the N digital signals to matrix switching unit 9.

Matrix switching unit 9 has sets of N (=63) data input terminals arranged in respective four directions, and comprises a matrix of switches each capable of outputting data input from one direction to a selected one of three directions. Based on preselected switching settings, matrix switching unit 9 outputs a number of digital channel signals from SDH demapping circuits 34, 36, digital signals from PDH line interface unit 1, and digital signals from signal demultiplexers 11, 13 selectively to SDH mapping circuits 35, 37, PDH line interface unit 6, and signal multiplexers 10, 12.

Figure 7:
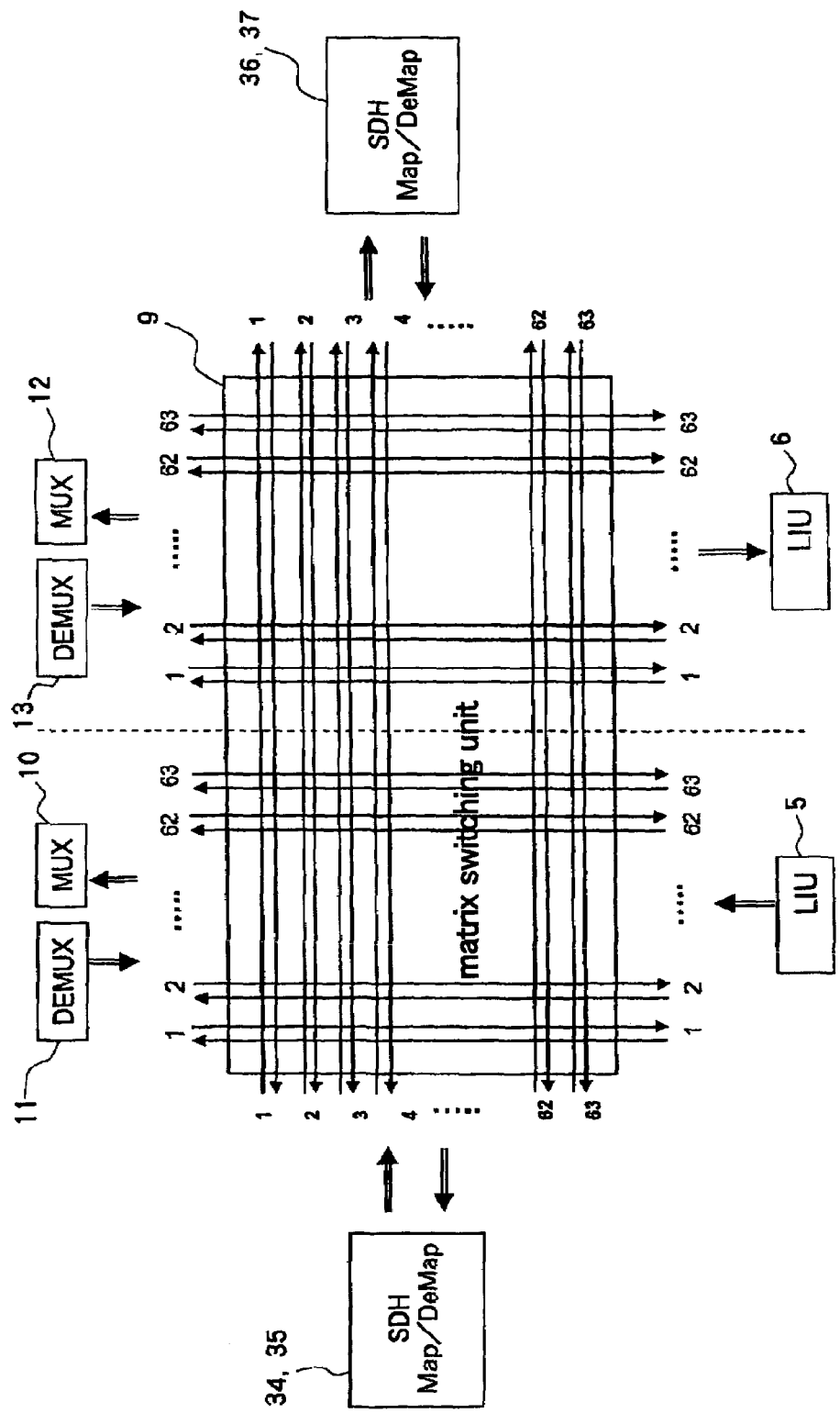
FIG. 7 is a diagram of a matrix switching unit of the digital modulating and demodulating device shown in FIG. 6.
Figure 8:
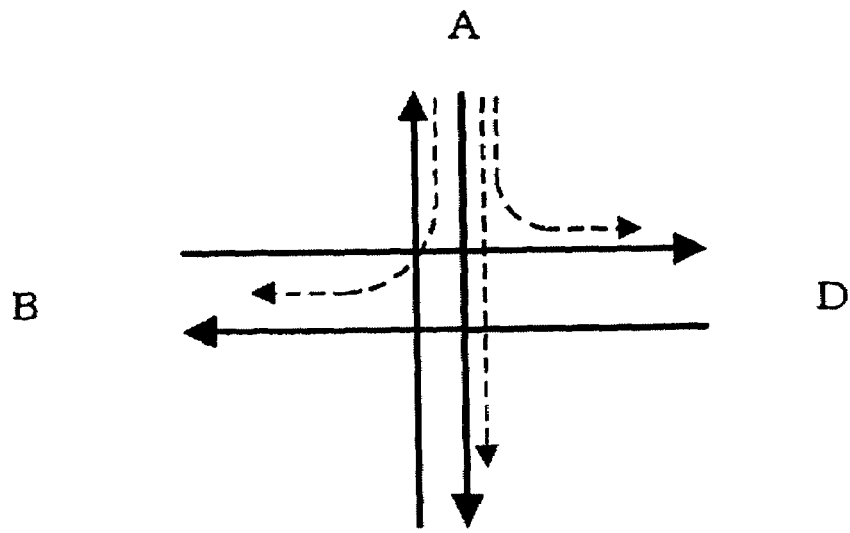
FIG. 8 is a diagram showing a switch of the matrix switching unit shown in FIG. 7.

In FIG. 7, matrix switching unit 9 has a matrix of 63×126 switches, each shown in FIG. 8, disposed at respective crossings of vertical and horizontal lines. Each of the switches can output a signal input from one of four directions selectively to the remaining three directions. In FIG. 8, the switch outputs a signal input from direction A to either one of three directions B, C, D.

According to the present invention, matrix switching unit 9 has its settings software-configured. Specifically, the settings of matrix switching unit 9 are software-configured depending on the application of the digital modulating and demodulating equipment according to the embodiment of the present invention. In this manner, the digital modulating and demodulating equipment can be used in any of various applications by changing the settings of matrix switching unit 9.

Operation of the digital modulating and demodulating device according to the embodiment of the present invention will be described in detail below.

In FIG. 6, a number of PDH baseband signals supplied to PDH baseband signal input terminal 1 pass through PDH line interface unit 5.

Figure 9:
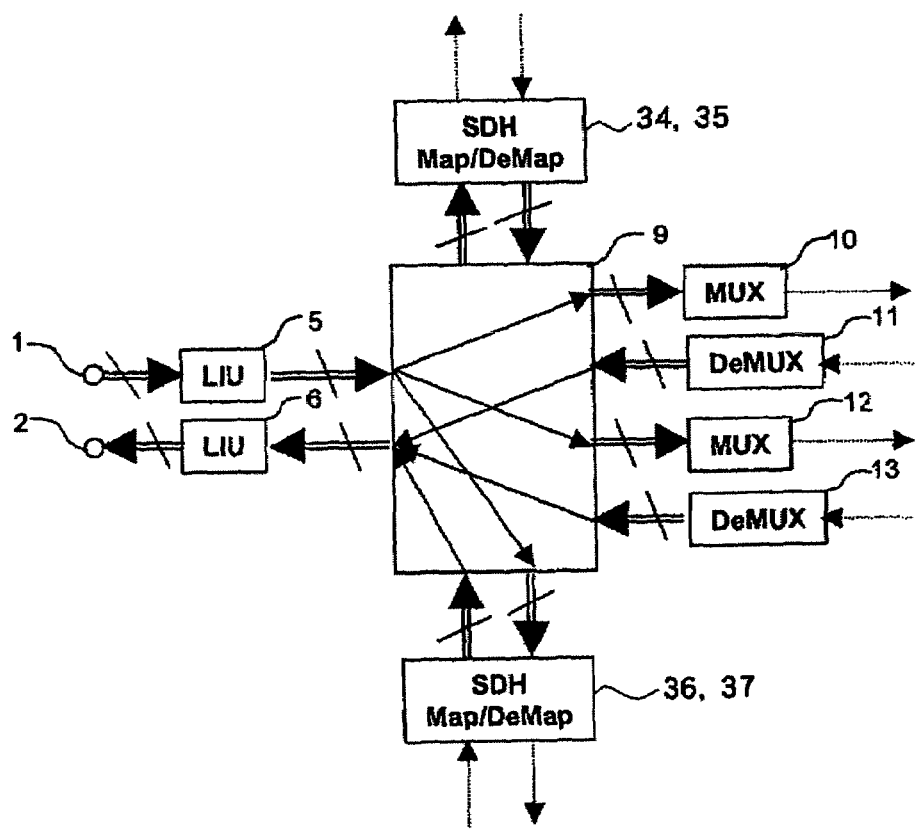
FIG. 9 is a block diagram showing switching paths for signals input from a PDH line interface unit.

Then, as shown in FIG. 9, the PDH baseband signals are transmitted through one of the two paths (1), (2), described below, in matrix switching unit 9, and output from the digital modulating and demodulating device.

(1) The path selectively connected to signal multiplexers 10, 12, from the signals are transmitted through transmitter digital processing units 14, 16 to modulators 18, 20, after which the signals are output from modulated signal output terminals 22, 24.

(2) The path selectively connected to SDH mapping circuits 35, 37, from which the signals are transmitted through SDH physical interfaces 31, 33, after which the signals are output from SDH signal output terminals 27, 29.

Figure 10:
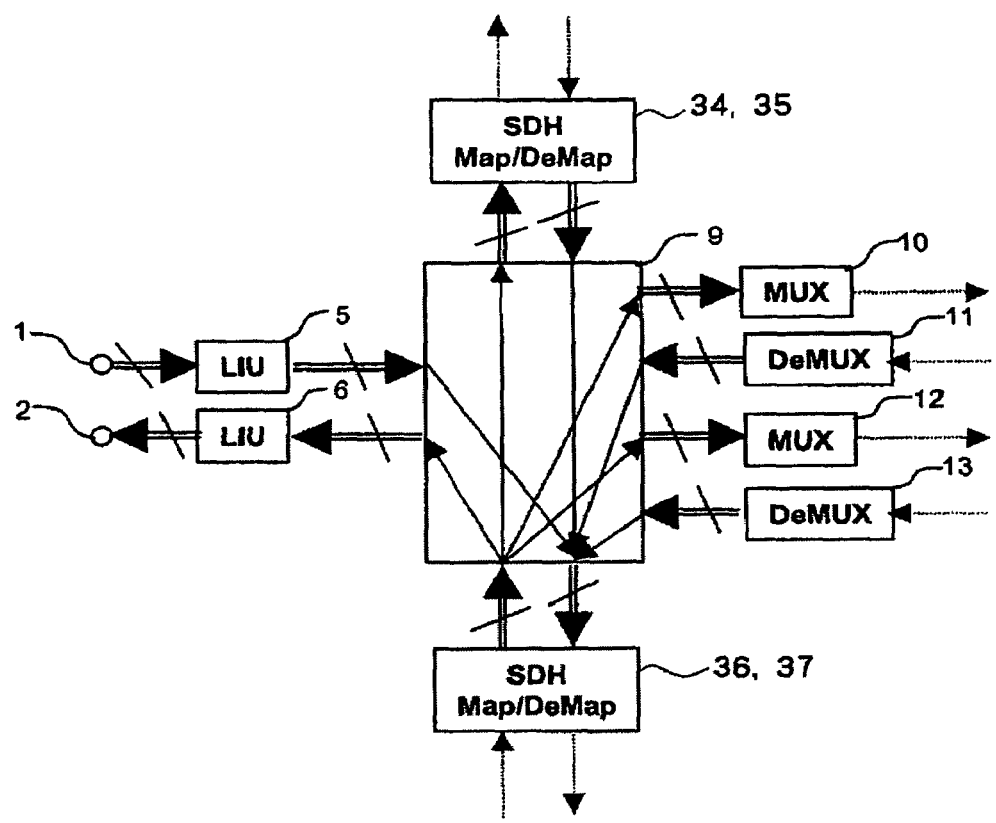
FIG. 10 is a block diagram showing switching paths for signals input from SDH demapping circuits.

SDH signals supplied to SDH signal input terminals 26, 28 pass through SDH physical interfaces 30, 32 and are converted by SDH demapping circuits 34, 36 into a number of digital signals. Then, as shown in FIG. 10, the digital signals are transmitted through one of the three paths (1), (2), (3), described below, in matrix switching unit 9, and output from the digital modulating and demodulating device.

(1) The path selectively connected to PDH line interface unit 6, from which the signals are sent to and output from PDH baseband signal output terminal 2.

(2) The path selectively connected to signal multiplexers 10, 12, from which the signals are transmitted through transmitter digital processing units 14, 16 and modulators 18, 20, after which the signals are output from modulated signal output terminals 22, 24.

(3) The path selectively connected to SDH mapping circuits 35, 37, from which the signals are transmitted through SDH physical interfaces 31, 33, after which the signals are output from SDH signal output terminals 27, 29.

Figure 11:
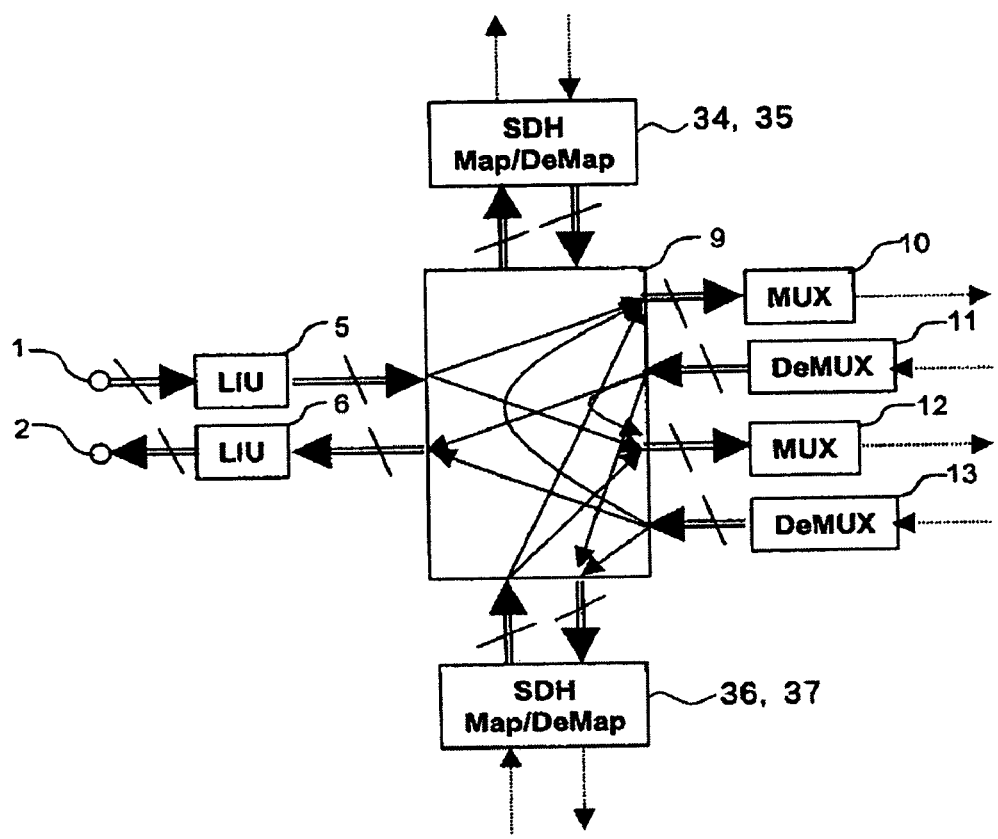
FIG. 11 is a block diagram showing switching paths for signals input from signal demultiplexers.

Modulated signals input from modulated signal input terminals 23, 25 are processed by receiver digital processing units 15, 17 and demultiplexed by signal demultiplexers 11, 13 into a number of digital signals. Then, as shown in FIG. 11, the digital signals are transmitted through one of the three paths (1), (2), (3), described below, in matrix switching unit 9, and output from the digital modulating and demodulating device.

(1) The path selectively connected to PDH line interface unit 6, from which the signals are sent to and output from PDH baseband signal output terminal 2.

(2) The path selectively connected to signal multiplexers 10, 12, from which the signals are transmitted through transmitter digital processing units 14, 16 and modulators 18, 20, after which the signals are output from modulated signal output terminals 22, 24.

(3) The path selectively connected to SDH mapping circuits 35, 37, from which the signals are transmitted through SDH physical interfaces 31, 33, after which the signals are output from SDH signal output terminals 27, 29.

Arrangements of communication systems which incorporate the digital modulating and demodulating device according to the embodiment of the present invention will be described below.

Figure 12:
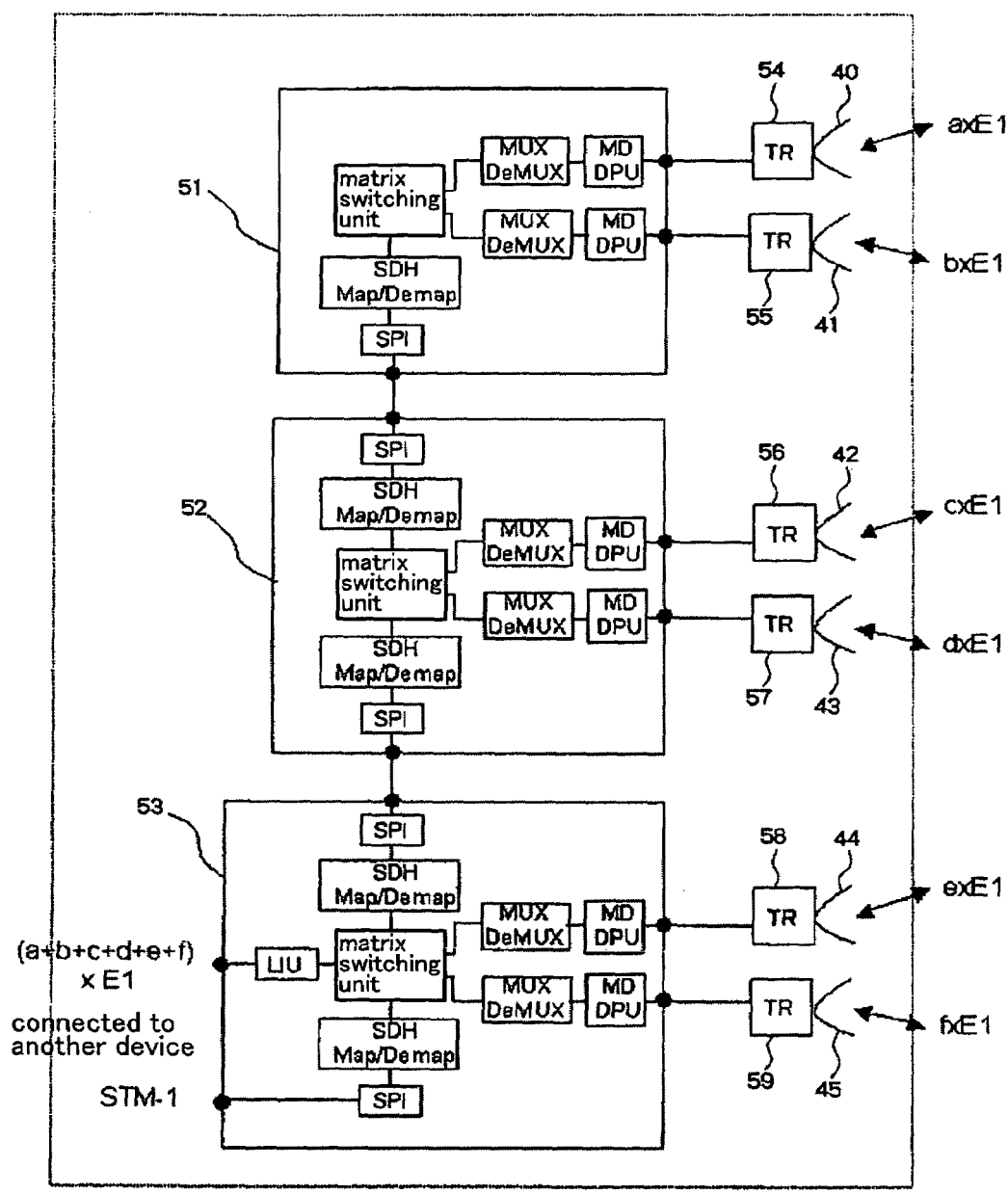
FIG. 12 is a block diagram of a central station in a six-way dividing system which incorporates the digital modulating and demodulating device according to the embodiment of the present invention.

FIG. 12 shows in block form a central station in a six-way dividing system which incorporates the digital modulating and demodulating device according to the embodiment of the present invention. The central station shown in FIG. 12 comprises digital modulating and demodulating device 51 through 53 according to the embodiment of the present invention, transmitter/receivers (TR) 54 thr5ough 59, and antennas 40 through 45.

In digital modulating and demodulating device 51 through 53 shown in FIG. 12, SDH mapping circuit 35 and SDH demapping circuit 36 are represented as a single block labeled "SDH Map/DeMap", and SDH physical interfaces 30, 31 or 32, 33 are represented as a single block labeled "SPI" because of space limitations. Signal multiplexer (MUX) 10 or 12 and signal demultiplexer (DeMUX) 11 or 13 are also represented as a single block labeled "MUX DeMUX", and transmitter digital processing unit 14 or 16 and receiver digital processing unit 15 or 17 are also represented as a single block labeled "MDDPU".

Operation of the central station shown in FIG. 12 will be described below. In FIG. 12, six-way divided signals are transmitted and received respectively by antennas 40 through 45. Signals received by antennas 40, 41 are frequency-converted by transmitter/receivers 54, 55, respectively, and then supplied to modulated signal input terminals of digital modulating and demodulating device 51. In digital modulating and demodulating device 51, the signals are demodulated by the demodulators and converted by the receiver digital processing units into digital signals, which are demultiplexed into a number of digital signals by the signal demultiplexers. The digital signals are transmitted through selected paths in the matrix switching unit, converted by the SDH mapping circuit associated with digital modulating and demodulating device 52 into an SDH signal, which is transmitted through the SDH physical interface and output from the SDH signal output terminal to the SDH signal input terminal of digital modulating and demodulating device 52.

Similarly, signals received by antennas 42, 43 are supplied to modulated signal input terminals of digital modulating and demodulating device 52. In digital modulating and demodulating device 52, the signals are demodulated by the demodulators and converted by the receiver digital processing units into digital signals, which are demultiplexed into a number of digital signals by the signal demultiplexers. The digital signals are transmitted through selected paths in the matrix switching unit, converted by the SDH mapping circuit associated with digital modulating and demodulating device 53 into an SDH signal, which is transmitted through the SDH physical interface and output from the SDH signal output terminal to the SDH signal input terminal of digital modulating and demodulating device 53. The SDH signal input from digital modulating and demodulating device 51 to the SDH signal input terminal of digital modulating and demodulating device 52 passes through the SDH physical interface and is demultiplexed by the SDH demapping circuit into a number of digital signals. The digital signals are transmitted through selected paths in the matrix switching unit and combined with each other. The combined signal is converted by the SDH mapping circuit associated with digital modulating and demodulating device 53 into an SDH signal, which is transmitted through the SDH physical interface and output from the SDH signal output terminal to the SDH signal input terminal of digital modulating and demodulating device 53.

Similarly, signals received by antennas 44, 45 are supplied to modulated signal input terminals of digital modulating and demodulating device 53. In digital modulating and demodulating device 53, the signals are demodulated by the demodulators and converted by the receiver digital processing units into digital signals, which are demultiplexed into a number of digital signals by the signal demultiplexers. The digital signals are transmitted through selected paths in the matrix switching unit, converted by the SDH mapping circuit associated with another digital modulating and demodulating device into an SDH signal, which is transmitted through the SDH physical interface and output from the SDH signal output terminal. Alternatively, the signal is transmitted through the PDH line interface unit and output from the PDH baseband signal terminal. The SDH signal input from digital modulating and demodulating device 52 to the SDH signal input terminal of digital modulating and demodulating device 53 passes through the SDH physical interface and is demultiplexed by the SDH demapping circuit into a number of digital signals. The digital signals are transmitted through selected paths in the matrix switching unit and combined with each other. The combined signal is converted by the SDH mapping circuit associated with the other digital modulating and demodulating device into an SDH signal, which is transmitted through the SDH physical interface and output from the SDH signal output terminal. Alternatively, the signal is transmitted through the PDH line interface unit and output from the PDH baseband signal terminal.

PDH baseband signals or an SDH signal that is input from another device to digital modulating and demodulating device 53 passes through an interface circuit. The PDH signals are input to the matrix switching unit, and the SDH signal is demultiplexed by the SDH demapping circuit into a number of digital signals, which are input to the matrix switching unit. Some of the signals pass through the signal multiplexer, the transmitter digital processing unit, and the modulator, and are output from the modulated signal output terminals. The signals are supplied to and frequency-converted by transmitter/receivers 58, 59 into signals, which are output from antennas 44, 45.

Another digital signal output from the matrix switching unit is converted by the SDH mapping circuit associated with digital modulating and demodulating device 52 into an SDH signal such as an STM-1 signal. The SDH signal is transmitted through the SDH physical interface and output from the SDH signal output terminal to digital modulating and demodulating device 52. In digital modulating and demodulating device 52, the supplied SDH signal is converted into a number of digital signals, which are divided by the matrix switching unit. Some of the signals are transmitted to transmitter/receivers 58, 59, and then output from antennas 42, 43. The other signals are converted by the SDH mapping circuit associated with digital modulating and demodulating device 51 into an SDH signal, which is supplied to digital modulating and demodulating device 51. In digital modulating and demodulating device 51, the supplied SDH signal is converted into a number of digital signals, which are divided by the matrix switching unit. The signals are transmitted to transmitter/receivers 54, 55, and then output from antennas 40, 41.

Figure 13:
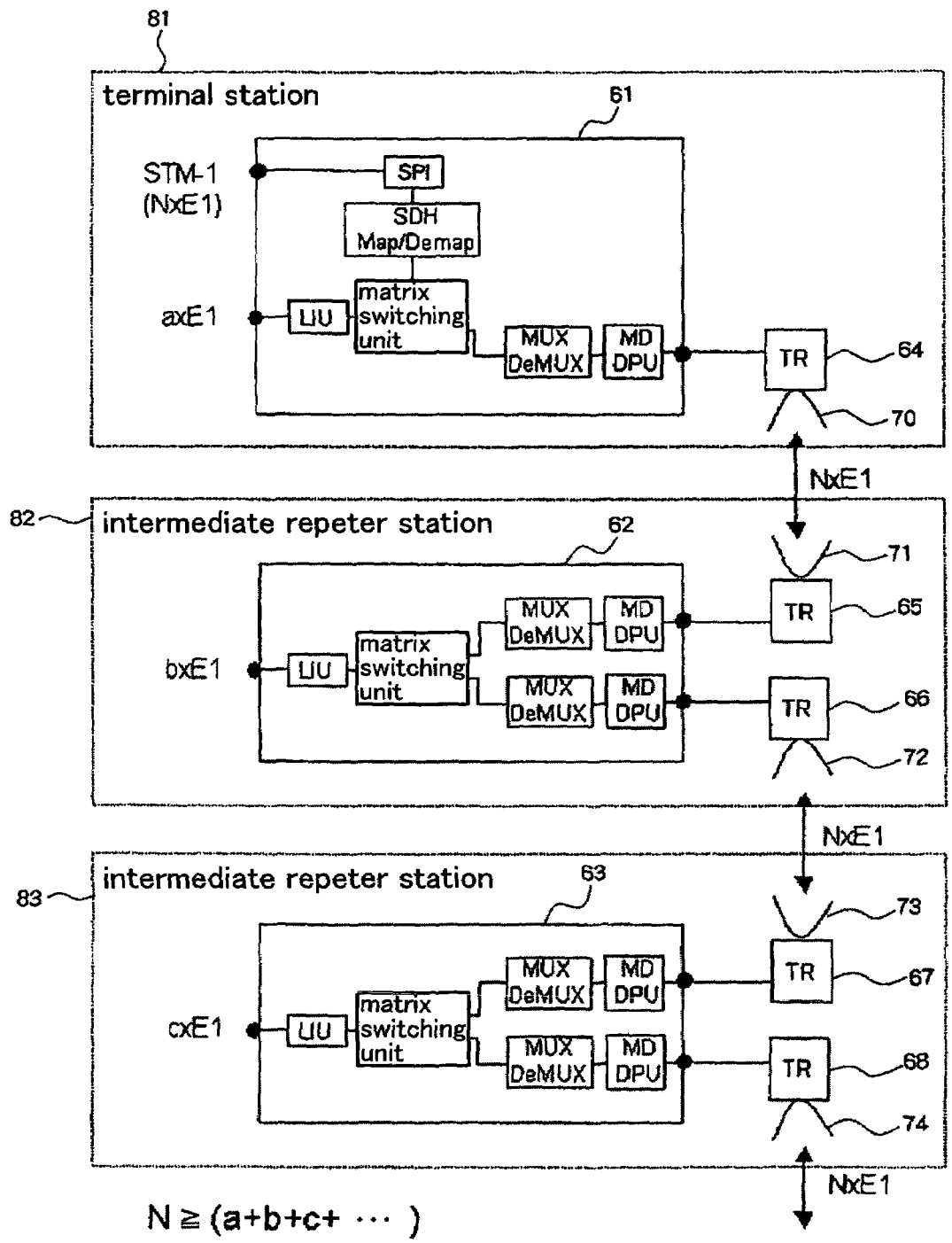
FIG. 13 is a block diagram of a terminal station and intermediate repeater stations in a tandem-connected system which incorporates the digital modulating and demodulating device according to the embodiment of the present invention.

FIG. 13 shows in block form a terminal station and intermediate repeater stations in a tandem-connected system which incorporates the digital modulating and demodulating device according to the embodiment of the present invention. As shown in FIG. 13, the tandem-connected system comprises terminal station 81, intermediate repeater stations 82, 83, . . . , and a terminal station (not shown). Terminal station 81 comprises digital modulating and demodulating device 61 according to the embodiment of the present invention, transmitter/receiver 64, and antenna 70. Intermediate repeater station 82 comprises digital modulating and demodulating device 62 according to the embodiment of the present invention, transmitter/receivers 65, 66, and antennas 71, 72. Intermediate repeater station 83 comprises digital modulating and demodulating device 63 according to the embodiment of the present invention, transmitter/receivers 67, 68, and antennas 73, 74.

Operation of the tandem-connected system shown in FIG. 13 will be described below. An SDH signal input to the SDH signal input terminal of digital modulating and demodulating device 61 of terminal station 81 or PDH baseband signals input to the PDH baseband signal input terminal thereof are transmitted through selected paths in the matrix switching unit and combined with each other. The combined signal is transmitted through the signal multiplexer (MUX), the transmitter digital processing unit (TDPU), and the modulator (MOD), and then output from the modulated signal output terminal to transmitter/receiver 64. The frequency-converted signal from transmitter/receiver 64 is radiated from the antenna 70 into the space.

The signal output from terminal station 81 is received by antenna 71 of intermediate repeater station 82, and frequency-converted by transmitter/receiver 65. Thereafter, the signal is input to the modulated signal input terminal of digital modulating and demodulating device 62. The signal is processed by the demodulator (DEM) and the receiver digital processing unit (RDPU), and demultiplexed by the signal demultiplexer (DeMUX) into a number of digital signals, which are input to the matrix switching unit. Signals input to the PDH baseband signal input terminal of digital modulating and demodulating device 62 are transmitted through the PDH line interface unit (LIU) to the matrix switching unit. The signals are transmitted through selected paths in the matrix switching unit and combined with each other. The combined signal is transmitted to a transmitter/receiver in another direction through the signal modulator (MOD), the transmitter digital processing unit (TDPU), and the modulator (MOD). The frequency-converted signal from transmitter/receiver 65 is radiated from the antenna 70 into the space.

In intermediate repeater station 83 and other cascaded intermediate repeater stations, the above operation of intermediate repeater station 82 is repeated. Therefore, intermediate repeater stations can be connected in tandem without the need for cables for transmitting PDH baseband signals between the intermediate repeater stations.

As described above, the digital modulating and demodulating device according to the embodiment of the present invention is of a structure which is a combination of matrix switching unit 9 and SDH mapping and demapping circuits 34, 37 newly added to a digital modulating and demodulating device having a PDH interface which is capable of changing a transmitter capacity/a modulating process based on software. The digital modulating and demodulating device according to the embodiment of the present invention thus has interfaces for a baseband signal such as an E1/T1 signal for PDH device and an SDH signal for SDH device. Matrix switching unit 9 can be software-configured to determine transmitting directions for all signals including PDH baseband signals to be dropped and added, per predetermined minimum unit such as E1/T1 signal. The digital modulating and demodulating device allows different device to be interconnected through a minimum number of cables using the SDH interfaces.

The digital modulating and demodulating device according to the embodiment of the present invention has two sets of signal multiplexers and demultiplexers 10 through 13, transmitter and receiver digital processing units 14 through 17, and modulator and demodulators 18 through 21 which are connected to matrix switching unit 9. The single digital modulating and demodulating device can transmit signals selectively in two directions or can be constructed as an intermediate repeater station. Transmitter capacities/modulating processes in two directions can independently be switched based on software to make it possible to provide an device arrangement having a number of transmitter capacities/modulating processes.

According to the present embodiment, a basic PDH device arrangement having an interface for PDH baseband signals is combined with SDH mapping and demapping circuits 34 through 37 and matrix switching unit 9 for connection to an SDH device having an interface for an SDH signal such as an STM-1 signal, and matrix switching unit 9 can provide a number of directions for transmitting signals. Because SDH interfaces are employed, different device can be interconnected by two cables regardless of the transmitter capacity. A number of devices can be interconnected by alternately connecting SDH interfaces for inputting and outputting signals.

The digital modulating and demodulating device according to the embodiment of the present invention has two sets of SDH physical interfaces 30 through 33, SDH mapping circuits 35, 37, and SDH demapping circuits 34, 46 for inputting and outputting SDH and PDH signals for greater system flexibility. However, the digital modulating and demodulating device may have one set of circuits as a minimum for inputting and outputting SDH and PDH signals. Specifically, the digital modulating and demodulating device according to the embodiment of the present invention is effective even if SDH physical interfaces 31, 32, SDH mapping circuit 35, and SDH demapping circuit 36 are deleted from the arrangement shown in FIG. 6.

While a preferred embodiment of the present invention has been described using specific terms, such description is for illustrative purposes only, and it is to be understood that changes and variations may be made without departing from the spirit or scope of the following claims.

What is claimed is:

1. A digital modulating and demodulating device comprising:

an SDH signal input terminal for inputting an SDH signal;
an SDH signal output terminal for outputting an SDH signal;
a PDH baseband signal input terminal for inputting a PDH baseband signal;
a PDH baseband signal output terminal for outputting a PDH baseband signal;
first and second modulated signal input terminals for inputting modulated signals;
first and second modulated signal output terminals for outputting modulated signals;
a first SDH interface for extracting a clock signal from an SDH signal input from said SDH signal input terminal, converting a code format of said SDH signal, and outputting a converted data signal together with said extracted clock signal;
an SDH demapping circuit for being supplied with the data signal and the clock signal output from said first SDH interface, and demultiplexing said data signal into a number of channel signals;
an SDH mapping circuit for being supplied with said channel signals and a clock signal, mapping the supplied channel signal into a data signal according to a predetermined mapping process, and outputting the data signal together with the clock signal;
a second SDH interface for converting the data signal and the clock signal output from said SDH mapping circuit into an SDH signal having a predetermined interface format, and outputting the SDH signal from said SDH signal output terminal;
a first PDH interface for extracting a clock signal from a PDH baseband signal input from said PDH baseband signal input terminal, converting said PDH baseband signal into a digital signal having a predetermined format, and outputting said digital signal together with said extracted clock signal;
a second PDH interface for converting a supplied digital signal into a signal having a predetermined code format and outputting the converted signal from said PDH baseband signal output terminal;
a first signal multiplexer for multiplexing a number of supplied channel data signals;
a first transmitter digital processing unit for digitally processing a multiplexed digital signal output from said first signal multiplexer according to a process compatible with a modulating process for modulating the digital signal;
a first modulator for modulating a digital signal input from said first transmitter digital processing unit and outputting the modulated digital signal from said first modulated signal output terminal;
a first demodulator for demodulating a modulated signal input from said first modulated signal input terminal into a digital signal;
a first receiver digital processing unit for digitally processing a demodulated digital signal input from said first demodulator according to a process compatible with the process performed by said first transmitter digital processing unit;
a first signal demultiplexer for demultiplexing a data signal output from said first receiver digital processing unit into a number of digital channel signals;
a second signal multiplexer for multiplexing a number of channel data signals input thereto and outputting a multiplexed digital signal;
a second transmitter digital processing unit for digitally processing a multiplexed digital signal output from said second signal multiplexer according to a process compatible with a modulating process for modulating the digital signal;
a second modulator for modulating a digital signal input from said second transmitter digital processing unit and outputting a modulated signal from said second modulated signal output terminal;
a second demodulator for demodulating a modulated signal input from said second modulated signal input terminal into a digital signal;
a second receiver digital processing unit for digitally processing a demodulated digital signal input from said second demodulator according to a process compatible with the process performed by said second transmitter digital processing unit;
a second signal demultiplexer for demultiplexing a data signal output from said second receiver digital processing unit into a number of digital channel signals; and
a matrix switching unit for outputting digital channel signals from said SDH demapping circuit, a digital signal from said first PDH interface, and digital signals from said first and second signal demultiplexers selectively to said SDH mapping circuit, said second PDH interface, and said first and second signal multiplexers per channel based on preselected switching settings, wherein said matrix switching unit has sets of data input terminals arranged in respective four directions, and comprises a matrix of switches each capable of outputting data input from one direction to a selected one of three directions.

2. A digital modulating and demodulating device according to claim 1, comprising two sets of said first and second SDH interfaces, said SDH mapping circuit, and said SDH demapping circuit.

3. A digital modulating and demodulating device according to claim 1, wherein the respective four directions are each orthogonally oriented relative to one another in a single plane.

* * * * *